JOHN B. GOODWIN,
INVENTOR.

BY Knight & Rodgers
ATTORNEYS.

INVENTOR.
JOHN B. GOODWIN,
BY
Knight + Rodgers
ATTORNEYS

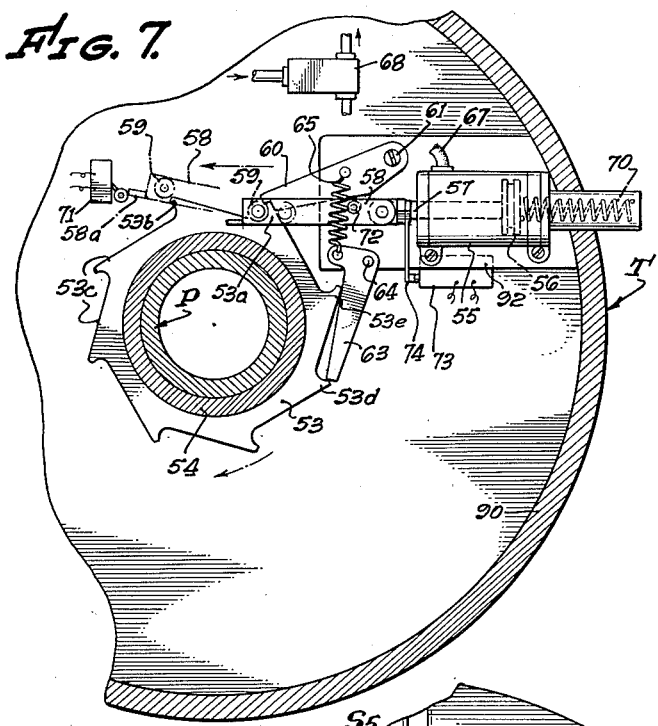

Nov. 26, 1957 — J. B. GOODWIN — 2,814,216
MULTIPLE SPINDLE MACHINE FOR DRILLING, TAPPING AND SIMILAR OPERATIONS
Filed Dec. 28, 1953

INVENTOR.
JOHN B. GOODWIN,
BY
ATTORNEYS

United States Patent Office 2,814,216
Patented Nov. 26, 1957

2,814,216

MULTIPLE SPINDLE MACHINE FOR DRILLING, TAPPING AND SIMILAR OPERATIONS

John B. Goodwin, Lynwood, Calif., assignor to J & F Manufacturing Company, Vernon, Calif., a corporation of California Application December 28, 1953, Serial No. 400,577

4 Claims. (Cl. 77—23)

The present invention relates generally to machine tools and more particularly to a machine tool having a plurality of spindles for performing successive operations simultaneously on a series of work pieces.

In the production of various machine elements, it is often necessary to perform a plurality of operations upon a single work piece, such as drilling and tapping holes, reaming, facing, and the like. In general these are operations which can be done by rotating tools turning about a fixed axis with relation to the work piece. One possible way of presenting a series of tools in succession to a work piece is to provide a turret-head type of machine carrying a plurality of tools, the turret and assembled tools rotating about a fixed axis. In a machine of this character, only one work piece can ordinarily be worked on at a time so that all but one of the tools are idle at any given instant. The total time for the completion of one work piece is the total time for all the operations on the one piece. Although the machine may be engaged in operating upon a work piece almost continuously, the maximum possible production of the machine is not being realized because most of the various tools are idle.

Hence it is a general object of my invention to provide a more efficient machine tool having a plurality of individual and separate tools, all so arranged and constructed as to permit use of all of its tools for the maximum amount of time.

It is also an object of my invention to provide a multiple spindle machine tool in which a plurality of spindles are so arranged as to be able to perform different operations simultaneously upon a series of individual work pieces.

In order to obtain a simple and compact machine, it is advantageous to provide a single power source from which all the spindles are driven. However, it is not possible to obtain maximum flexibility in operation and diversification in use of the machine unless the spindles are capable of individual adjustment of their speed of rotation and, in some cases, the direction of rotation.

Accordingly, it is an object of my invention to provide a machine tool having a plurality of spindles and including means for driving the spindles from a single power source with provision for individual speed changes and reversing drive of one or more spindles without affecting the operation of the other spindles.

In a multiple tool machine where all the tools are not performing the same operation, the time required to complete the operation, which is the time of the engagement of the tool with the work piece, ordinarily varies from tool to tool. Longer than minimum contact with the work produces unnecessary wear of the tools. It is generally undesirable to maintain tools in contact with the work piece longer than is necessary and likewise it is desirable to operate them under the most efficient conditions for the nature of each operation performed.

Consequently, it is a general object of my invention to provide a multiple spindle machine which includes means for individually controlling the movement of the spindles toward and away from the work piece to permit the spindles to each move at speeds and in a direction independently of the other spindles but with means for initiating the cycle of operations of all spindles at the same time.

It is also a general object of my invention to provide a machine which is adapted to handle individual blank work pieces without regard to a particular method of forming the blanks and to present them in succession to each one of the plurality of tools by means which accurately and firmly positions the work piece with respect to each of the tools.

The above and other objects of my invention are attained in a multiple spindle machine tool constructed according to my invention by providing a frame including a central column upon the upper part of which is mounted a stationary head. A work table is rotatively mounted on the column to revolve about the axis of the column, which is normally vertical. The work table is located a suitable distance below the head and carries a plurality of work holders each adapted to hold a work piece.

A plurality of spindles are mounted in a circular pattern on the head with their axes parallel to each other and to the axis of the column. The mounting means for each spindle mounts it for individual rotational movement about its own axis as well as longitudinal axial movement toward and away from the work table and the work mounted thereon.

The drive means for rotating the spindles is mounted on top of the head. It includes a centrally disposed primary shaft from which all spindles are driven through a plurality of suitable gear trains. In order to obtain maximum flexibility in operation of the machine, it is preferred that at least some of the spindles be driven through gear trains which include a pair of gears on an axially movable counter-shaft to provide a change speed transmission by which the speed of any one spindle can be changed without affecting the speeds of other spindles. For the same reasons, it is preferable that the final drive to each spindle be by a belt passing around two step pulleys, giving a further range of driving speeds.

In order to adapt the machine to tapping operations, it is preferable that one or more of the spindles be provided with gearing adapted to reverse the direction of spindle rotation thus allowing a tap to be reversely rotated when being withdrawn from the tapped hole.

Individual axial movement of the spindles is accomplished through a double acting hydraulic power unit connected to each spindle and individually controlled by valve mechanism able to direct hydraulic fluid to a selected side of the piston in the hydraulic power unit. The valves and power units are connected to a common source of fluid under pressure and are able to produce simultaneous axial travel of all spindles. The control valve has two fluid passages which produce different rates of fluid flow, thereby preferably producing at least a high and a low speed of spindle travel. One of these passages may be provided with manually adjustable valve means so that the rate of travel at the low speed can be individually established at the desired value for each spindle according to the machining operation performed by the spindle.

The work table is provided with indexing means producing intermittent angular movement of the table. There are typically eight work holders, although the number may be changed as desired, spaced at equal angular intervals. Accordingly, the indexing means advances the table one-eighth revolution at each operation. An hydraulic cylinder advances the table and holds it against a stop, providing positive locking and positioning of the table at the end of each forward stroke of the table indexing means.

The number of spindles is preferably less than the number of work holders by one or two, in order to provide a station for loading and unloading the work holders. I disclose a typical embodiment employing six spindles and eight equally spaced work holders, the spindles being positioned so that work pieces are moved from one spindle to another in succession by each full indexing movement of the table. Because of the smaller number of spindles, a work holder at times requires two indexing movements to reach the next spindle.

Operation and control of the machine is effected through an electric control circuit which operates the hydraulic control valve at each spindle and the hydraulic cylinder of the indexing means in timed relation to one another. Suitable switches are associated with each spindle to be actuated by the spindle one at each end of the spindle travel and also one at an intermittent point to initiate spindle movement in each direction and to change the spindle travel from high sped to low speed just prior to reaching the work pieces. This circuit causes all spindles to start the travel downwardly toward the work pieces at the same time, traveling first at high speed and then changing to low speed. At the proper position for the travel of each spindle, direction of the spindle travel is reversed, still at low speed. When all spindles are reversed, the circuit automatically shifts all valves to high speed position for raising the spindles away from the work pieces. When all spindles have ended reverse travel, the circuit operates the indexing mechanism to advance the table and then at the end of the indexing movement initiates a new cycle of spindle operation. The only hand operation required is to place blank work pieces individually in the work holders as they pass the loading position and remove them as they again reach this position after being machined.

How the above objects and advantages of my invention, as well as others not specifically referred to herein, are attained will be more readily understood by reference to the following description and to the annexed drawings, in which:

Fig. 3 is a fragmentary side elevation as indicated at 3—3 of Fig. 1;

Fig. 7 is a fragmentary transverse section on line 7—7 of Fig. 1 showing the mechanism for indexing the work table;

Figure 1:
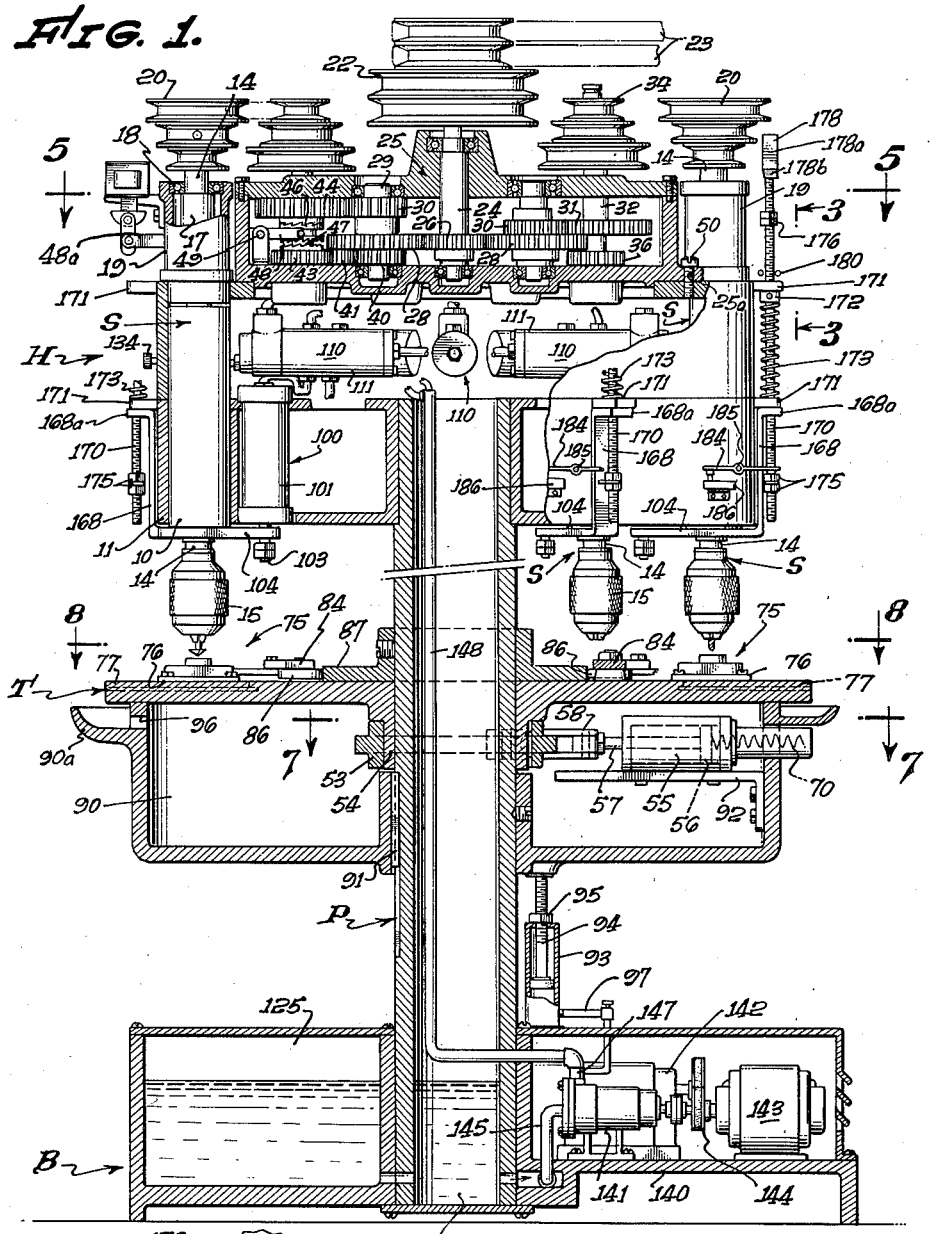
Fig. 1 is a vertical median section through a multiple spindle machine constructed according to my invention.
Figure 5:
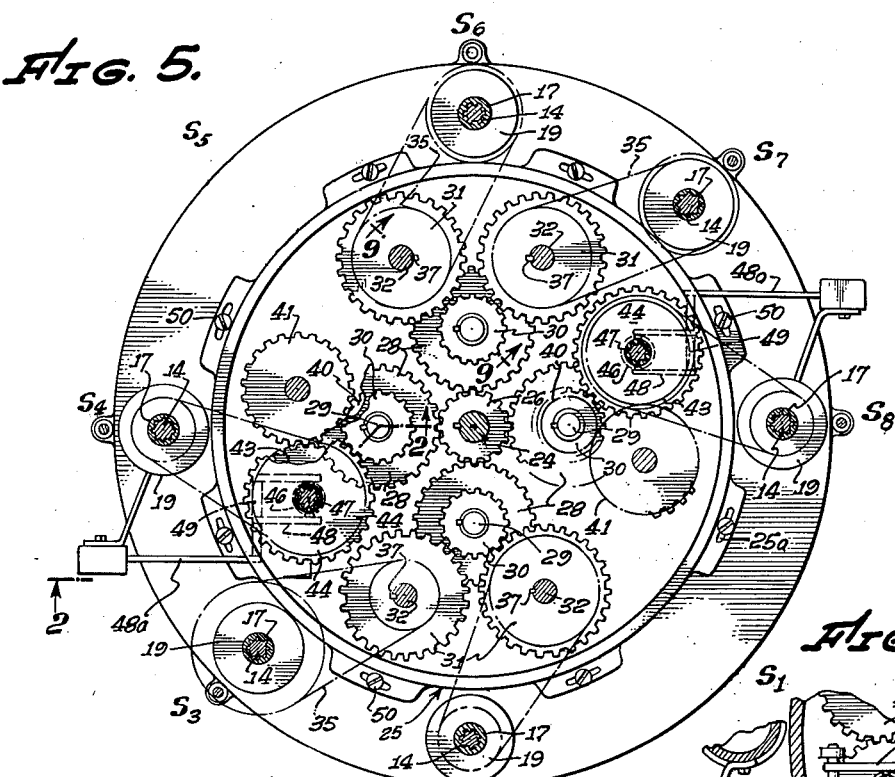
Fig. 5 is a horizontal transverse section on line 5—5 of Fig. 1 showing the gear train driving the spindles.
Figure 6:
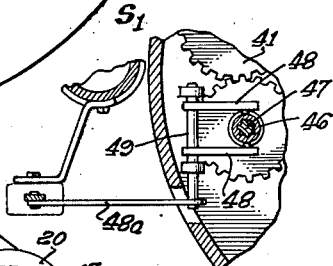
Fig. 6 is a fragmentary horizontal section taken just below the plane of Fig. 5 and showing a portion of the mechanism for reversing the drive to one of the spindles.
Figure 4:
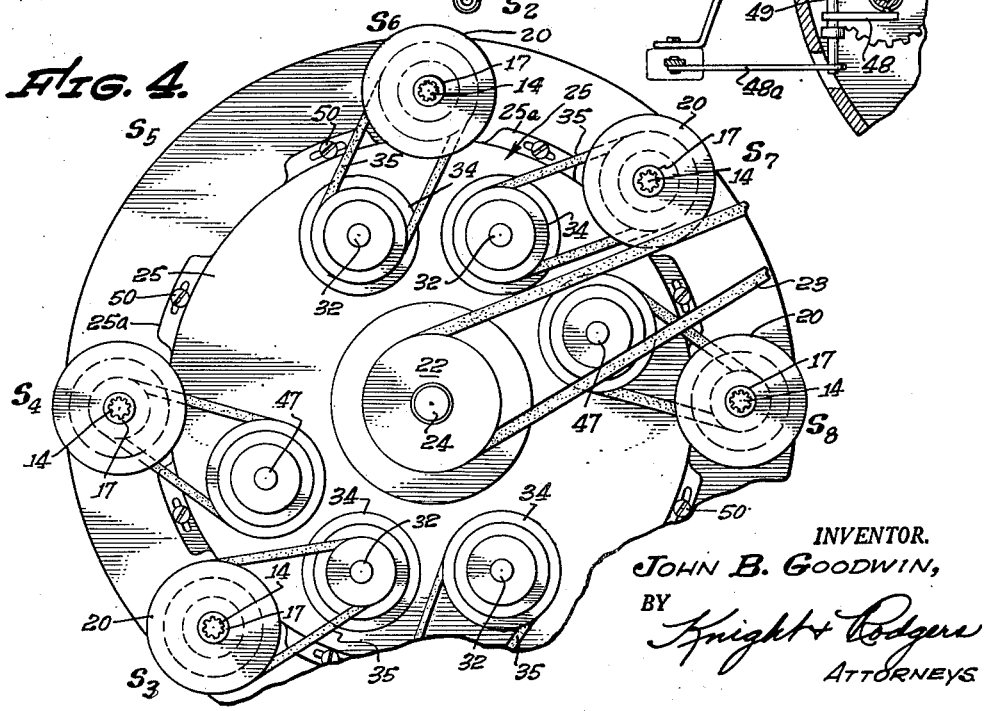
Fig. 4 is a top plan view of the machine showing the drive pulleys.
Figure 10:
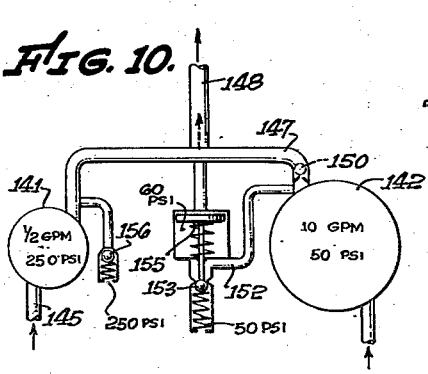

Fig. 8 is a horizontal section on line 8—8 of Fig. 1 just above the work table showing work holders on the table, the figure being rotated 45° clockwise relative to Figs. 4 and 5;

Fig. 9 is a fragmentary vertical section on line 9—9 of Fig. 5 showing a change speed mechanism in the gear train;

Fig. 10 is a diagrammatic showing of a part of the hydraulic system; and

Figure 11:
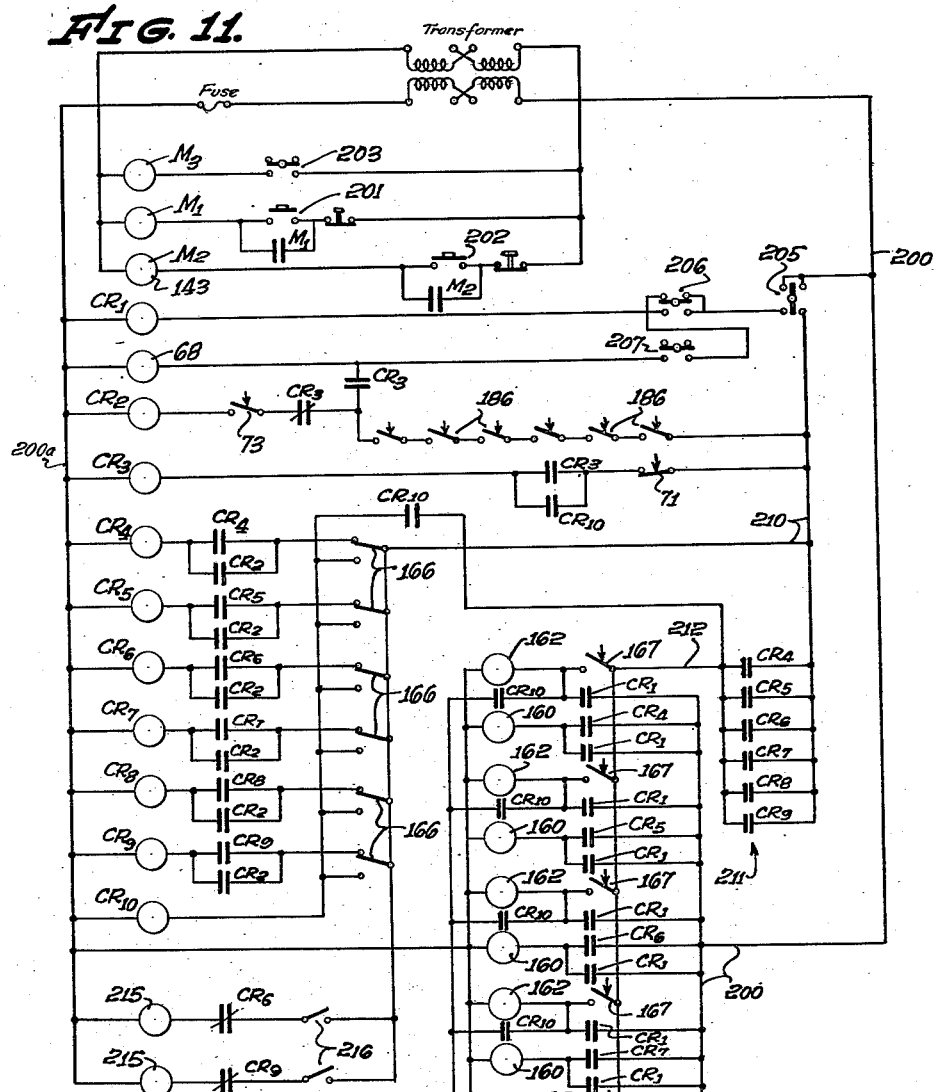

Fig. 11 is a schematic wiring diagram of the electric circuit for controlling the operations of the multiple spindles.

Referring now to Fig. 1, it will be seen that the machine comprises a plurality of spindles each indicated generally at S with their axes parallel and extending vertically. These spindles are mounted on a stationary head generally indicated at H, the drive mechanism for driving the spindles from a common power source being carried on the upper end of the head. The working tools are mounted on the lower end of the spindles to engage work pieces which are mounted upon work table T which is intermittently moved angularly around central post P. Post P is hollow and supports the work table and also head H upon a base B.

Spindles S are all alike and are here shown as being six in number, although the number of spindles may be more or less as desired. As may be seen by reference to Figs. 4 and 5, the spindles are arranged in two groups of three each spaced 45° apart with an interval of 90° between the two groups. This is the same spacing for the spindles as for eight equally spaced work stations, as discussed below, but with spindles at two stations omitted. At one station the omitted spindle provides a station for loading and unloading the work holders while the diametrically opposite station on the head is idle.

Figure 2:
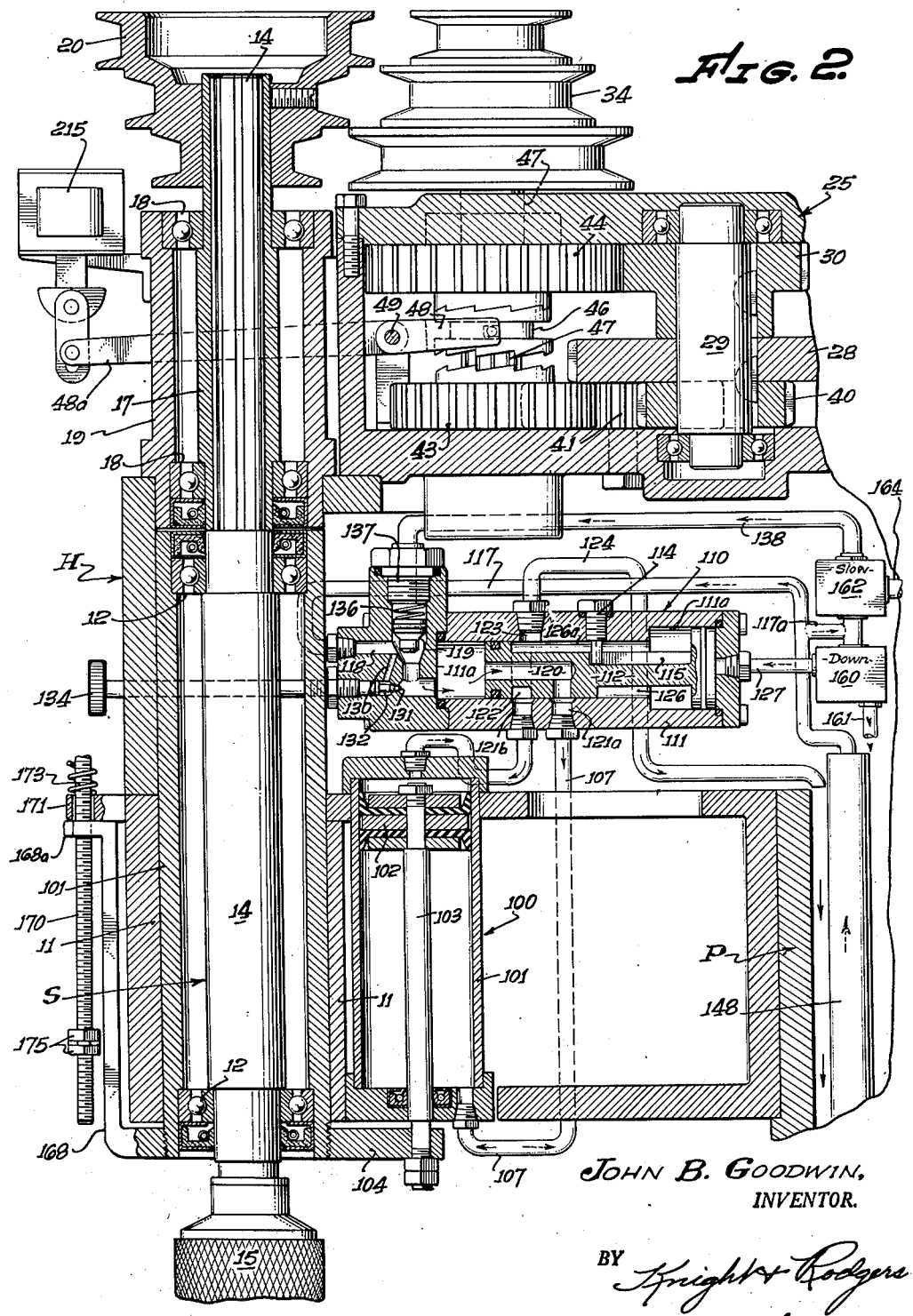
Fig. 2 is an enlarged fragmentary vertical section taken on line 2—2 of Fig. 5, according to a portion of Fig. 1.

As may be seen best in Fig. 2, each spindle includes a quill 10 which is slidably mounted for vertical movement in bearing 11 carried upon the stationary head H of the machine. Inside the quill and rotatably mounted in bearings 12 of any suitable type is spindle shaft 14 upon the lower end of which is mounted chuck 15. Shaft 14 has a spline section at its upper end which engages surrounding sleeve 17 to allow relative longitudinal movement of the shaft. Sleeve 17 is mounted rotatably in bearings 18 in a stationary housing 19 mounted upon head H. To the upper end of sleeve 17 is attached pulley 20 which drives shaft 14 through the spline between the sleeve and shaft. Pulley 20 is here shown as being a step pulley of conventional design in order to present a selection of driving speeds, as is well known in the art.

The means for driving the six spindles from a single prime mover is shown particularly in Figs. 4 and 5. In addition to providing for speed reduction between the prime mover and all the spindles, this particular driving mechanism provides for individual changes of speed between selected spindles and the driving gears and also provides reversing gears applied to two of the six spindles. Generally speaking, the drive means comprises a plurality of belt driven step-pulleys constituting the final drive and mounted above a gear box 25 which incloses a plurality of gear trains for driving the pulleys in unison. The gear box 25 has upper and lower, horizontally disposed walls which support the bearings for the several shafts to be described. The main drive, as shown in Fig. 4, is through centrally located pulley 22 which is driven by belt 23 from an electric motor or other suitable prime mover, not shown in the figure, but indicated at M1 in the wiring diagram of Fig. 11. Pulley 22 is mounted on shaft 24 which is the primary power shaft of the gear box. It carries on its lower end drive pinion 26, as may be seen in Figs. 1 and 5. Drive pinion 26 meshes with and drives four gears 28 located at intervals of 90° around the axis of shaft 24. Each of the gears 28 is drivingly mounted on a vertically extending counter-shaft 29 which also carries a smaller gear 30 mounted near the upper end of the counter-shaft.

As shown also in Fig. 2, two of the gears 30 each mesh with and drive two gears 31, each of the four gears 31 being drivingly mounted upon one of four shafts 32. Shafts 32 comprise a second set of counter-shafts arranged in this design so that two of these shafts 32 are outwardly of and associated with each of the first mentioned counter-shafts 29. Each of the shafts 32 extends through and above top plate 25 and has mounted upon its upper end a step pulley 34 which drives a belt 35 passing also around a pulley 20 on the upper end of drive shaft 14 of one of the spindles. Four of the six spindles are thus driven.

An optional change speed arrangement is shown in Fig. 9 in which each one of four of the shafts 32 just referred to carries, in addition to gear 31, a second smaller gear 36 which upon axial movement of the shaft is adapted to mesh directly with gear 28 to effect a change in the relative speeds of shafts 29 and 32. With this purpose in mind, pulley 34 is keyed at 37 or otherwise connected to shaft 32 in a suitable manner to provide for longitudinal movement of the shaft with respect to the pulley. Spring biased detent means 38 is provided to hold the shaft against longitudinal movement with respect to pulley 34 when in either one of the two driving positions in which gears 36 and 28 (Fig. 9) or gears 31 and 30 (Fig. 1) are in driving engagement.

In order to adapt this machine to certain specific operations, as for example tapping, in which reverse rotation of the spindle may be required, the two remaining spindles at diametrically opposite positions (stations S4 and S8) are here shown as being provided with similar reversing gear drives. In this arrangement, the drive to each of the two spindles concerned, as shown in Fig. 2, includes an extra driving gear 40 on counter-shaft 29 that turns with gear 28 and is preferably about the same size as driving gear 30. Reverse drive is from gear 40 that meshes with and drives idle gear 41 which in turn drives gear 43 that is loosely mounted to turn about a shaft 47. Forward drive is from shaft 29 through gear 30 to meshing gear 44 loosely mounted on the same shaft 47. Gears 40 and 41 and also gears 30 and 44 are continually in mesh.

The opposed faces of the hubs on gears 43 and 44 on the same shaft 47 are each formed with driving clutch teeth that can be engaged selectively by collar 46 slidable on shaft 47 and driving the shaft through a spline or similar connection. Collar 46 has teeth on both sides and can be shifted axially of shaft 47 to engage either gear 43 or 44, as desired, by fork 48 pivotally mounted at 49 on gear box 25 and operated by shifting lever 48a. Each shaft 47 also carries a step pulley 34 driving on belt 35.

The entire gear box 25 is mounted on top of head H and is held in place by a plurality of screws 50 passing through slotted ears 25a (Figs. 1 and 4). When the screws are loosened, the gear box can be turned about its central vertical axis with respect to the stationary head H of the machine. Movement of the gear box clockwise viewed from above increases the tension in all drive belts 35 simultaneously while reverse rotation of the gear box decreases the tension in all the belts. When the belt tension for this final drive is properly adjusted, screws 50 are tightened to maintain it by holding the gear box in place on head H.

The belt-type final drive between each take off shaft 32 and a spindle shaft 14 is preferred because it permits the use of step pulleys 34 and 20 which conveniently provide for individual variations in spindle speeds. Thus means for individually varying the speed of any given spindle is provided in the means for driving all of the spindles from a central prime mover.

Directly beneath the head H and also supported upon center post P is the work table T, as seen in Fig. 1. The work table comprises a disc like plate which is rotatably mounted upon the center post in order to revolve with respect to the several spindles. The work table carries a plurality of work holders, there being one work holder at each of eight equally spaced stations which provides an angular spacing between successive work holders equal to the angular spacing between successive spindles.

Underneath the table, is provided means for indexing the table by advancing it through successive angular movements each equal to the interval between successive work stations or positions of the work holders. This means includes indexing wheel 53 which is fastened to the hub 54 of work table T. Indexing wheel 53 is provided with eight equally spaced teeth around the circumference, as is shown particularly in Fig. 7.

Cooperating with the indexing wheel, is means for engaging successive teeth on the wheel to advance the table. Such means includes hydraulic cylinder 55 attached to bracket 92. Within the cylinder piston 56 reciprocates. Connected to the piston, is piston rod 57 which extends throughout one end of the cylinder and is connected pivotally to link 58. The piston rod is connected to one end of link 58 which consists of a pair of spaced bars carrying between them a pin or roller 59 adapted to engage the teeth on indexing wheel 53. Rotational movement of wheel 53 in a forward or clockwise direction is limited at the end of each advance by engagement of the wheel with stop member 60 which is pivoted at 61 so that it can swing into and out of engagement with the indexing wheel. A second lever 63, which is pivotally mounted at 64 to bracket 92, also engages the teeth on the indexing wheel but in this case the purpose is to prevent reverse rotation of the indexing wheel. Both stops 60 and 63 are normally urged toward operating positions in which they engage the teeth of wheel 53 by spring 65, one end of the spring being attached to each of these levers at positions such that tension in the spring pulls the two stop members about their respective pivots into operational positions.

Hydraulic fluid under pressure is introduced into cylinder 55 through conduit 67, flow of fluid being controlled by solenoid valve 68. Valve 68 is normally open to permit fluid under pressure to enter cylinder 55 and urge piston 56 to the right, as shown in Fig. 7. Pin 59 engaging the back side of a tooth 53a on wheel 53 is pulled by link 58 to bring the front of the tooth into firm engagement with stop member 60, as shown in full lines in Fig. 7. When solenoid valve 68 is actuated, as will be described later, to discharge fluid from cylinder 55, piston 56 is moved to the left by force applied by spring 70. Link 58 then moves into the position shown by dot-dash lines in Fig. 7. Roller 59 has just been moved out over the flat surface connecting two successive teeth 53a and 53b until the roller is ready to drop over the next tooth 53b on wheel 53. As the roller drops into position behind the tooth, a projection 58a on the end of link 58 engages the switch arm of microswitch 71 to actuate the switch to open its contacts. This action causes solenoid valve 68 to be restored to a position in which fluid under pressure flows through the valve into cylinder 55. Fluid under pressure exerts a force on piston 56 that compresses spring 70 and moves the piston to the right, pulling on link 58 to return to the full line position. As a consequence, indexing wheel 53 is advanced clockwise by the angular distance between two successive teeth.

When link 58 moves to the left in Fig. 7, roller 59 rides along a surface 53c of the indexing wheel between two successive teeth. This surface is inclined with respect to the axis or direction of movement of piston rod 57. This inclination causes the outer end of link 58 to swing radially outward with reference to the indexing wheel. This movement of the link is utilized to release stop 60 from engagement with the indexing wheel prior to advancing the wheel; and for this purpose link 58 is provided with a cross pin 72 in a position to engage link 60. As the connecting link 58 moves to the left, pin 72 acts as a cam to force link 60 clockwise about pivot 61 a sufficient distance to clear the indexing wheel. After the wheel is advanced by a complete reciprocation of link 58, stop 60 is returned to the position shown by a tension spring 65. This is the normal position in which one side of the tooth on the indexing wheel is engaged by roller 59 to exert continuously a force on the tooth pressing the other side of the tooth against stop 60. Thus the indexing wheel is held firmly between these two members to secure accurate positive indexing and retention of the indexing wheel and the attached table T in the proper position after each indexing motion of the hydraulic cylinder and its attached link 58.

Even when roller 59 is not exerting a force on the indexing wheel, reverse rotation of the wheel and table is prevented by engagement of a tooth on the wheel with stop 63, such as tooth 53d. As the wheel advances, the following tooth 53e on the indexing wheel presses against stop 63, and the stop is moved aside by swinging about its pivot 64. As soon as tooth 53e reaches the next position 53d, the stop lever is pulled in immediately behind the tooth by the force exerted on the lever by spring 65.

As a part of the control circuit described later, microswitch 73 is mounted on bracket 92 in a position to be engaged by arm 74 mounted on piston rod 57 when the piston and rod reach the end of their stroke toward the right. Switch 73 is normally open and is closed upon engagement by arm 74.

Mounted on the top of work table T are the eight work holders individually indicated at 75. A particular type or design of work holder employed is in no way limitative upon the present invention and the particular work holders disclosed herein are merely illustrative of the mechanism which may be employed for this purpose. Each work holder 75 includes a base plate 76 which is attached to the work table by screws passing into T-slots 77 in the work table, the slots allowing adjustment of the position of the work holder in a direction radially of the table. On the base plate is mounted a stationary work holding jaw 78 while the complementary movable jaw 79 slides in a pair of guides on the base towards and away from the stationary jaw 78.

Motion of movable jaw 79 is induced by knee-type linkage composed of links 80 and 81 each pivotally connected at one end to link 82 which is preferably adjustable in length and pivoted at 83 to the work table. Link 80 is pivotally conntced at one end to sliding jaw 78 while link 81 is pivoted at its outer end to follower arm 84. Follower arm 84 is pivoted at 85 to the work table and carries on its free end cam follower 86 which rides over the peripheral surface of stationary cam 87.

In Fig. 8 the several successive positions of the work holders are numbered from one to eight in a clockwise direction commencing with the work holder at the bottom of the figure. Since there are eight work holders equally spaced apart and the successive movements of the work table are equal to the angular spacing between successive work holders, these positions are also the eight work stations occupied in succession by each of the work holders, starting with the first station S1 and going through successive stations to S8. Station number S1 is assumed to be the station at which the work holders are loaded and unloaded.

The action of the work holder is illustrated in Fig. 8 as angular advancement of the table moves the work holder from station S1 to station S2. During this movement, cam follower 86 moves over cam surface 87a from a point of minimum radius on cam 87 outwardly to a point of maximum radius. This causes arm 84 to swing in a clockwise direction about stationary pivot 85. The movement of this arm is communicated through links 81 and 80 to sliding jaw 78 which is advanced towards stationary jaw 77 to engage and firmly grip a work piece, not shown in the drawings, between the two jaws. Cam 87 has an arcuate surface 87b of uniform radius for the major portion of its circumference; and as follower 86 rides over this circular portion of the cam surface, no movement of the jaws of the work holders takes place. During this portion of the table movement, which is that required to move the work holder from station S2 through successive stations to station S8, the work piece is firmly gripped in place.

After the work holder leaves station S8, follower 86 moves over surface 87c to return to a point of minimum radius on the active surface of cam 87 with the result that follower arm 84 is rotated counterclockwise about fixed pivot 85 and sliding jaw 79 is moved away from the fixed jaw 78 to the position shown at station S1 in Fig. 8. This movement releases the work piece, allowing it to be removed from the work holder and replaced by a new blank piece which is to be worked upon.

Directly beneath table T is a large circular pan 90 which is supported by center post P. It is keyed or otherwise attached to the post as indicated at 91 in a manner to prevent rotation of the pan with respect to the post. The top rim of the pan is level and provides a support for the work table as it rotates about the center post. Hydraulic cylinder 55 is mounted upon pan 90 by means of a bracket indicated at 92. The assembly consisting of the pan, work table, and table indexing means may be moved up or down in order to adjust the spacing between the work table and the tools in chucks 15. For this purpose there is provided hydraulic cylinder 93 having inside it a piston connected by rod 94 to the bottom of pan 90. By means of oil pressure introduced into the cylinder through line 97, the pan and work table may be elevated; and the same parts may be lowered by exhausting hydraulic fluid from cylinder 93. Rod 94 is preferably threaded and provided with lock nut 95 which may be screwed down to bear against the upper end of cylinder 93 in order to hold the pan and table in any adjusted position.

Pan 90 is preferably provided with lip 90a which extends entirely around the periphery of the pan and to a diameter greater than the work table in order to catch the liquid coolant which runs off the table. Coolant falls on lip 90a and then drains to the interior of pan 90 through one or more drain openings 96. Pan 90 thus also acts as a sump to collect the coolant or cutting lubricant which may be of any conventional kind. A circulating system for such coolant is not shown since systems of this type are conventional and well known to the machine tool art and form no part of the present invention; however a motor M3 is shown in the wiring diagram of Fig. 11 which may be used to circulate the coolant.

Vertical movement of the spindles S is accomplished and controlled by hydraulic means. The hydraulic means provides means for controlling the movement of each spindle independently of the movement of the others although all spindles are raised and lowered at the same time and receive their power from a common source of fluid under pressure. For this purpose, each spindle has its own power unit 100 which consists of a double acting cylinder 101 within which piston 102 reciprocates. Piston rod 103 is connected to the piston and projects outwardly of the cylinder through one end. The outer end of piston rod 103 is connected to plate 104 which is also attached to the lower end of quill 10 so that vertical movement of piston rod 103 produces vertical movement of the spindle.

In order to adapt the machine to tapping operations, it is preferable that at those spindles used for tapping there be provision for some relative movement between plate 104 and piston rod 103. In Fig. 2 the distance between the shoulder and locknuts on the end of rod 103 is greater than the thickness of plate 104. After a tap is started in a work piece, it is self-feeding; and the lost motion or play between plate 104 and rod 103 allows the tap to feed slightly faster than piston 102 descends. Consequently the rate of descent of spindle does not need to be set with a high degree of accuracy. Likewise, when reversed to remove the tap—as explained later—the tap can move up at a slightly different rate than the spindle as a whole.

Hydraulic lines 106 and 107 are attached to the upper and lower ends respectively of cylinder 101 to introduce fluid under pressure into the cylinder in order to effect movement of the piston as will now be described. Hydraulic lines 106 and 107 are also connected to a hydraulic control unit indicated generally at 110, there being one such control unit for each spindle in order to provide individual control for each spindle. It will be understood that more than one spindle may be controlled from or by any given control unit 110 by branching the two hydraulic lines 106 and 107 to effect connections with more than one power unit 100 in the event that it is desired to have identical movement imparted to two or more spindles S.

Each control unit 110 comprises a body member 111 having a longitudinally extending differential bore 111a within which reciprocates movable valve member 112, in the form of a differential piston. The smaller end of valve member 112 is exposed to the inlet for working fluid and the inlet fluid pressure in the small end of bore 111a; while the larger end is subjected to fluid pressure for the purpose of shifting the valve member relative to body 111. Because of the difference in areas exposed to the fluid pressures, it is possible to use the same fluid pressure for shifting the valve longitudinally of the internal bore 111a. Since valve member 112 is preferably circular in cross section, it is held against rotational movement within body 111 by pin 114 which extends into a longitudinally extending slot 115 in valve 112.

Delivery conduit 117 is connected to inlet passage 118 of control unit 110 at a point ahead of valve 119 which is adapted to close passage 118. When valve 119 is open, as shown in Fig. 2, fluid goes through passage 118 into the central bore 111a and then into passage 120 within valve 112. When valve 112 is to the extreme right as shown in Fig. 2, the outlet end of passage 120 registers with a port 121a in body 111 which is connected to hydraulic conduit 107 which delivers fluid to the lower end of power unit 100. This flow is shown by arrows in full lines. When movable valve member 112 is shifted to the left hand position, passage 120 within the valve body registers with a second port 121b in body 111 to which conduit 106 is connected so that fluid under pressure is then delivered from unit 110 to the upper end of power unit 100.

Since the admission of fluid at either side of piston 102 of the power unit requires that fluid at other side of the piston be simultaneously discplaced and exhausted, provision for such exhaust is made through control unit 110. With valve member 112 to the right, as in Fig. 2, fluid exhausted from power unit 100 through line 106 flows into passage 122 which is an annular groove in the movable valve member. Passage 122 registers with outlet port 123 in body 111, to which conduit 124 is connected. Fluid is discharged from the open end of conduit 124 into the hollow interior of post P which acts as a common return conduit to return hydraulic fluid from all units to the sump 125 in the base of the machine. When valve 112 is shifted to the left, fluid displaced from power cylinder 101 flows upwardly through line 107 and port 121a into annular passage 126 in valve 112, which passage is now in registration with port 121a connected to conduit 107. Annular grooves 122 and 126 are interconnected by longitudinal passage 126a always in registration with outlet port 123 and conduit 124, by which the exhaust fluid leaves.

Movable valve 112 is shifted to the left by fluid under pressure admitted through conduit 127 to apply fluid pressure to the larger end of bore 111a. Since the end area of the cylindrical valve exposed to the pressure entering from conduit 127 is greater than the area exposed to fluid entering through inlet 118, the valve moves to the left even though the unit hydraulic pressure is the same at each end.

The body of the control unit is provided with by-pass 130 which provides the means for by-passing fluid at a reduced rate around valve 119 when closed. By-pass 130 connects to inlet passage 118 at a point ahead of valve 119 and discharges into the same inlet passage at a point on the other side of valve 119 through orifice 131. Rate of flow through the orifice is controlled by metering valve 132. Thumb screw 134 is connected to metering valve 132 in order that the rate of fluid flow through it can be manually adjusted as desired.

Valve 119 is a solid plug slidably mounted in a bore within body 111 to act as a piston in the bore. The valve seats at its lower end against body 111 to close passage 118 to fluid flow. Compression spring 136 is confined between valves 119 and screw plug 137. The spring bears against the upper end of valve 119 urging the valve towards the closed position in opposition to fluid pressure on its under side from inlet 118 which raises the valve towards the open position. The upward force of fluid pressure exceeds the downward force of the spring. Fluid under pressure may also be applied to the upper side of valve 119 through conduit 138. This fluid is at the same pressure as the fluid in inlet 118; but since the fluid pressures on the top and bottom of the valve are applied over equal areas on the valve, they are therefore in balance. The net resultant force on the valve tends to close it and is the force applied to the valve by spring 136. Accordingly, when fluid under pressure is admitted through line 138 to exert pressure on the upper side of valve 119, fluid pressures above and below the valve are balanced and the valve is closed by spring 136. Fluid flow through inlet passage 118 is now reduced since fluid to enter bore 111a must go through by-pass 130 and orifice 131. This flow is regulated by manually setting needle valve 132.

Hydraulic fluid under pressure may be provided from any suitable source but the source is here shown as being a pair of motor driven pumps mounted on platform 140 constituting a part of the base B supporting central post P. Although it will be realized that other arrangements may be used, it is preferred to provide high pressure and low pressure pumps 141 and 142 respectively which are driven from motor 143 (M2 in Fig. 11). High pressure pump 141 is driven by direct connection to the motor shaft while the low pressure pump is driven by belt 144 passing over a pulley on the motor shaft.

This part of the hydraulic system is shown diagrammatically in Fig. 10. The suction line 145 supplies fluid to the two pumps from a sump or a reservoir 125 which is contained partly in the bottom of column P and partly in a container formed by the base of the machine. Both pumps are continuously driven by motor 143 so that some liquid pressure is maintained within the system at all times.

When fluid is being delivered against a relatively small head, as occurs when spindles S are stationary at the upper end of their movement or are all moving at their fast speed, both the high and low pressure pumps are delivering fluid into the system but at the low pressure. The larger proportion of the fluid so delivered comes from the low pressure pump since it has a comparatively higher delivery volume. Fluid so delivered from the pumps goes through manifold 147 into a common delivery pipe 148 which extends upwardly within the hollow center post of the machine and is connected at its upper end to a plurality of lines 117, each of the latter going to one of the control units 110.

The head against which hydraulic fluid is delivered increases as the several valves 119 are closed. Then pressure builds up within the system. When this pressure exceeds the maximum delivery pressure of the low pressure pump 142, the higher pressure of the fluid delivered by high pressure pump 141 causes check valve 150 to close, preventing reverse flow into the low pressure pump. With valve 150 closed, delivery of fluid at a higher pressure continues from pump 141 alone into delivery pipe 148. It is preferable to provide by-pass line 152, normally closed by relief valve 153 so that fluid delivered by the low pressure pump when check valve 150 is closed can flow through by-pass 152 into the reservoir.

An optional but preferred feature is inclusion in the circuit of valve operating mechanism 155. This device receives fluid under pressure from manifold 147 and is designed to open relief valve 153 at a slightly higher pressure than it would open in response to fluid pressure in line 152. The purpose of this arrangement is to hold relief valve 153 open and thereby reduce to a very low value the head against which the low pressure pump is delivering fluid during periods of high pressure in the system. This minimizes the work done by pump 142 and thus minimizes the rise in temperature in the circulated fluid.

It is also preferable to provide the high pressure pump with a conventional relief valve 156 which is designed to open at the maximum delivery pressure for which the pump is deisgned to return fluid to the reservoir. This valve serves as a safety valve to prevent the build up of undesirably high pressures within the hydraulic system.

Fluid from delivery pipe 148 flows to each of the control units 110 through a separate conduit 117. A branch conduit 117a supplies fluid under pressure to conduit 127 through solenoid valve 160. Valve 160 is a two position valve which in normal or close positions shuts off communication between conduits 117a and 127 while at the same time allowing fluid to exhaust from conduit 127 through the valve and out through outlet pipe 161 from which the fluid drains back to the reservoir through center post P. In the alternate or open position, valve 160 shuts off outlet pipe 161 and allows fluid under pressure to flow from conduit 117a through the valve into conduit 127 and the right hand end of control unit 110 for the purpose of shifting valve member 112.

Branch conduit 117a also communicates with conduit 138 through a second solenoid valve 162. Valve 162 is likewise a two position valve. In the normal or closed position of valve 162, communication with branch conduit 117a is shut off and fluid is allowed to flow in a reverse direction out of conduit 138 through the valve and out of conduit 164. From this latter conduit, the fluid drains down to the reservoir to the inside of center post P. In the alternate or open position of valve 162 fluid flows from branch line 117a through the valve to conduit 138 and thence to the top side of valve 119 to close this latter valve.

Solenoid valves 160 and 162 are controlled by separate microswitches 166 and 167 respectively which are mounted on head H shown at Fig. 3. Each switch 167 is a normally open switch in series with a solenoid controlling a valve 162. Switch 167 has a single set of contacts which, when closed, energize the associated solenoid valve 162 to move it to open position.

Switches 166 are each double throw switches with one set of contacts normally closed. Each switch, with the aid of a suitable relay, controls a solenoid valve 160 in such a manner that in the normal position of the switch, valve 160 is closed; but when the switch is moved to the alternate position, valve 160 is opened to permit fluid flow into line 127. The switches 166 and 167 are actuated by vertical movement of the individual spindles, there being one each of switches 166 and 167 associated with each of the spindles S, as shown in Fig. 3.

Suitably attached to each spindle S is an upwardly extending arm 168 which is conveniently made as an integral part of plate 104. At its upper end the arm is bent outwardly and horizontally for a short distance to provide extension 168a. This extension 168a is preferably forked or provided with a hole through which passes a vertically extending rod 170 which is slidably mounted for vertical longitudinal movement in a pair of fixed brackets 171 on head H. There is one rod 170 for each spindle. Collar 172 is attached to rod 171 by a set screw or other similar means and compression spring 173 surrounds the rod and bears it at lower end against the lower one of the brackets 171 and at its upper end against collar 172. The upward pressure exerted by spring 173 on the collar normally keeps rod 170 at the upper end of its stroke with collar 172 acting to limit the upward movement of the rod by engagement with the upper one of the two brackets 171, as shown in Fig. 1.

Below the lower bracket 171, rod 170 is preferably threaded and carries a pair of lock nuts 175 which can be adjusted to any desired position and then tightened to maintain them in that position. Rod 170 also extends above the upper bracket 171 where it is also preferably threaded and carries a second pair of lock nuts 176 which likewise can be moved to any desired position along the rod and then tightened against each other to maintain them in that position. To the upper end of rod 170 is attached cam block 178 which has on one side a cam surface which includes upper face section 178a which is parallel to the axis of rod 170, normally vertical, and lower face section 178b which is inclined slightly to the vertical and to the axis of rod 170.

Switch 167 is mounted on head H in a position such that its operating arm 179 engages and is swung in one direction by the inclined cam surface 178b as rod 170 is moved downwardly. This movement of operating arm 179 closes the contacts in switch 167. Continued movement downward of the cam merely causes the switch arm to engage surface 178a which, being parallel to the direction of cam movement, maintains the arm in the deflected position. Cam 178 is preferably adjustably mounted upon rod 170 in order to adjust the point in the travel of rod 170 at which switch 167 is actuated. As rod 170 continues down, lock nuts 176 engage the forked end of lever 180 which is pivotally mounted on head H at 181, causing the other end of the lever to move upwardly and actuate the contacts of switch 166, shifting them to the alternate position.

Above lock nuts 175 is a second lever 184 pivoted at 185 to head H. One end of the lever is forked to receive rod 170 and be engaged by nuts 175 as they move up. When one end of arm 184 is raised by engagement with nuts 175, the other end is depressed to actuate a microswitch 186. Each microswitch 186 is a normally open, single-throw switch with a single set of contacts, and all switches 186 are in series with each other.

A suitable wiring circuit for automatically controlling the operation of this machine is shown schematically in Fig. 11. Electric power for this circuit may be derived from any suitable source. A transformer is shown in the circuit to permit operation of the relays, solenoids, and the like at 110 volts. A pair of conductors 200 and 200a are connected to the two terminals of the transformer secondary.

Separate electric motors for the main source of power for driving the hydraulic pumps 141 and 142, and for driving the coolant pump are indicated respectively at M1, M2, and M3. These motors are connected in parallel to the power source and are each controlled by separate hand switches at 201, 202, and 203 respectively. These switches may be of any suitable type.

The master switch for the control circuit of the machine itself is switch 205 which is preferably a double-throw switch in order to provide for either manual or automatic operation of the machine and is connected at one side to conductor 200. Manual operation is entirely optional but is provided since it is of considerable assistance in initially setting up the machine to perform various operations on the work pieces. At that time, it may be desirable to index the work table by one station at a time, to operate the spindles individually and to perform other operations which can be more efficiently accomplished by a separate non-automatic circuit. For this purpose, from one of the contacts of switch 205 conductors go to switch 206 which is connected in series with control relay CR1. Also operating in series with switch 206 is an indexing switch 207 which may conveniently be of the push button type. Switch 207 is in series with solenoid valve 68 in order to energize that valve when indexing switch 207 is closed. Switches 206 and 207 are both hand operated.

From another contact of switch 205, goes a conductor 210 which energizes the elements of the circuit for automatic control; and it is to this side of the switch that are connected the fixed indexing switches 186 which are all connected in series with each other and in series with indexing solenoid valve 68 through a normally open set of contacts in control relay CR3. Indexing switches 186 are also connected in series with "start down" switch 73 and control relay CR2 through a normally closed contact in relay CR3. Control relay CR3 is connected in series with switch 71 to be operated thereby. Switch 71 is normally closed and is connected to the holding circuit of the relay so that when opened it opens CR3 to insure a single indexing movement of table T.

The control relays of this circuit are, in general, multiple contact type relays having several sets of contacts. These sets of contacts may be normally open but closed as long as the holding circuit of the relay is energized; or they may be normally closed contacts which are held open during the period that the relay is energized. Or a particular relay may include both types of contacts. Thus one set of normally open contacts in relay CR1 is connected in series with all of the twelve valves 160 and 162 so that all of these solenoid valves are energized when these contacts are closed upon energization of the relay by closing switch 206 in "down" position.

Solenoid valves 162 can also be energized individually by closing the associated microswitch 167, which is a normally open switch. Microswitch 167 is in parallel with the set of contacts of relay CR1 just mentioned, in order to permit energization of the solenoid either by the manually controlled circuit or the automatic circuit. Solenoid valves 160 which control the reversal of movement of the spindles may each be energized by closing contacts in a control relay which is wired in parallel with this same set of contacts of relay CR1. As may be seen from the wiring diagram, one contact of each of relays CR4, CR5, CR6, CR7, CR8, and CR9 is connected in series with one of the solenoid valves 160 and the opposing contact of the set is connected to conductor 200. The holding circuits of these six relays are normally energized through the normally closed set of contacts of double throw switches 166, these normally closed sets of contacts of the switches being connected in series with the holding circuits of these respective relays. Switches 166 upon actuation open the respective relays CR4, CR5, CR6, CR7, CR8 and CR9. The operation, as explained below, of solenoid valves 160 is in part the same as if they were connected directly in series with their respective controlling switches 166; but the intervention of control relays between switches 166 and valve 162 permits a better control over the automatic operation of the machine.

Each of the six relays CR4, CR5, CR6, CR7, CR8 and CR9 has one set of contacts indicated generally at 211, which are connected in parallel with each other between conductors 210 and 212 to supply power to all the switches 167. As long as any set of contacts in this group is closed, power is supplied to the switches; but conversely, when all of these contacts are open, no power reaches the switches or solenoid valves 162 controlled by the switches.

Control relay CR10 is wired in parallel with the bank of switches 167. It will be noted that the normally open contact of each of the switches 166 is connected to relay CR10. Hence the first switch 166 that is operated to close this normally open contact energizes relay CR10 which then locks in by its own holding contact. This action locks all spindles in slow travel because, when energized, the relay closes another set of contacts (shown immediately below each valve 162 in Fig. 11) connected between conductor 200 and each valve 162. This set of contacts is thus in parallel with contacts in CR1 and switches 167, providing a third circuit to energize valves 162. Closing the relay CR10 energizes all solenoid valves 162, moving them to the alternate position in which fluid flows through conduit 138.

When a spindle is provided with reversing gears to adapt it to a tapping operation, each clutch 46 is conveniently operated by solenoid 215 connected to lever arm 48a. In the drawing two of the spindles are so equipped and consequently there is shown in the schematic wiring diagram two solenoids 215. Each solenoid is separately controlled by a manual switch 216 in series which is moved by hand to either the on or off position. When switch 216 is open, the circuit to each solenoid is open and the solenoid is inactive so that the associated spindle always rotates forwardly. In series with each switch 216 and a solenoid 215 are normally closed contacts of one of the control relays, in this case relays CR6 and CR9. These contacts are open when the relays are energized and closed when de-energized to cause reverse rotation of the associated spindles.

Having described the structure of my improved multiple spindle machine and a control circuit therefor, the operation of the machine when under automatic control will now be described. At the beginning of the operation, motors M1, M2, and M3 are started by closing switches 201, 202, and 203 respectively. At this time switch 205 remains in the "off" position. Motor 142 builds up pressure in the hydraulic control system and delivers fluid under pressure through pipe 148 to all of the hydraulic control valves 110. These are normally in position to direct the fluid through line 107 into power unit 100 in a direction to raise piston 102. As a consequence, all of the spindles S are raised to their topmost position. With a spindle at the upper end of its travel, lock nuts 175 engage lever arm 184 and close index switches 186 so that when the spindles are all raised fully, all six switches are closed and complete the circuit to switch 73. Switch 73 is also closed because fluid pressure is admitted past solenoid valve 68 through line 67 to cylinder 55 where the fluid pressure maintains piston 56 and piston rod 57 at the extreme range of their travel, in which position arm 74 closes the contacts on switch 73. Assuming that the work holders are loaded and the proper tools are in chucks 15, the machine is ready to operate but no further action takes place until master switch 205 is moved from the "off" position to the position for automatic operation.

When in "automatic" position, switch 205 completes the circuit from conductor 200 to 210 to relay CR2 since switches 186 are all closed as are the normally closed contacts in relay CR3 and switch 73. Also relay CR3 is energized and closed since switch 71 is closed.

Energization of relay CR2 closes each of the control relays CR4, CR5, CR6, CR7, CR8, and CR9 since their circuits are completed by closing normally open contacts in relay CR2. Closing these six relays energizes the solenoids of all six valves 160, holding them in open position in which fluid under pressure flows into line 127. This fluid under pressure shifts valve 112 to the left from the position shown in Fig. 2 with the result that fluid enters units 100 at the top, as shown by the broken arrows, driving piston 102 down and lowering the spindles. Downward movement of each spindle continues under the individual application of fluid under pressure to its power unit 100. Initially the downward movement is at the fast rate since valve 119 is open.

At some point in the downward travel of each spindle cam 178 engages switch arm 179 and closes the normally open microswitch 167 associated with that spindle. When switch 167 closes, the associated solenoid valve 162 is energized and the valve opens allowing fluid to flow from line 117 through branch 117a and conduit 138 to force valve 119 to the closed position. In this position fluid can enter the control unit only through bypass 130 and metering port 131 where the rate of flow is controlled by needle valve 132. As a result, the downward movement of the spindle is slowed. In actual practice, each spindle as it is placed on slow down feed comes to a full stop, until the last of the spindles is on slow down feed. This means that all valves 119 are now closed so that high pressure pump 141 takes over and builds up the hydraulic pressure. As the pressure rises all spindles descend at the same time in slow feed. The exact rate at which each spindle descends when at slow speed is determined by the setting of needle valve 132 which can be adjusted manually by means of knob 134. Each spindle now descends at a slow speed which is best adapted to the particular work it is performing, and they all remain at this slow speed throughout the duration of this work stroke.

Referring back now to the wiring diagram, all the index switches 186 open as soon as the spindles leave their uppermost positions, deenergizing relay CR2 and allowing it to open. However, relays CR4, CR5, CR6, CR7, CR8 and CR9 remain closed since they are locked in by their respective holding contacts.

As each spindle S reaches the bottom of its travel on the downward work stroke, the lock nuts 175 on rod 170 are engaged by extension 168a of arm 168 to move the rod downwardly along with the traveling spindle. Near the end of the working stroke with the spindle, lock nuts 176 engage lever 180 which, upon movement, actuates microswitch 166. As each switch 166 is actuated, it breaks the circuit to its associated control relay in the group CR4 to CR9, so that when all six switches 166 have been actuated because all spindles have reached the end of their downward travel, all six relays CR4, CR5, CR6, CR7, CR8 and CR9 have been opened. As each of these latter relays is opened, it opens a set of contacts to break the circuit to the associated valve 160 which controls the direction of movement of the spindle.

When the solenoid of a valve 160 is deenergized, the valve moves to the closed position in which fluid is exhausted from conduit 127 through the valve and line 161, allowing valve member 112 in control unit 110 to return to the right hand poistion as shown in Fig. 2. This causes a reversal of fluid flow into cylinder 100. Fluid is now introduced at the bottom end of the cylinder as shown by the arrows in full lines so that the power unit causes the spindle to rise. Each spindle is free to reverse direction individually and start to move upwardly. Initially, this upward movement is at slow speed since valve 119 of control unit 110 is still in closed position. When all of the spindles have reached the bottom and all sets of contacts at 211 of the spindle relays have been opened, the power supply to all switches 167 is broken and all the solenoid valves 162 are deenergized. The effect is the same as if each individual switch 167 were opened. All the valves 162 are now returned to the closed position to stop flow to control units 110 through lines 138. Fluid under pressure is now drained from line 138 back through the valve and out through line 164, allowing valve 119 in unit 110 to be raised against the pressure of spring 136. This permits fluid entering control unit 110 to again flow at the full or fast rate. Consequently, the remainder of the up travel of all spindles is now at the fast speed. Each switch 167 is opened as the upward travel of rod 170 and cam 178 releases the switch arm 179 on the switch allowing the contacts of the switch to open, resuming their normal position.

When the relay CR6 and CR9 open, they each contain contacts which close to make the circuit to one of solenoids 215. If a switch 216 is closed the corresponding solenoid 215 is thus energized at the bottom of the down travel of the associated spindle. When a solenoid is energized, it shifts clutch coller 46 down to the position for reverse drive. This allows the tapping tool to rotate in the reverse direction as it is removed from the work piece by upward spindle movement. Forward drive is automatically restored at the beginning of the down travel of the piston when relay CR6 and CR9 are again energized and their contacts in series with the solenoids 210 are again opened.

When the spindles finish their upward movement, each one closes its respective indexing switch 186. When the last spindle reaches the end of its upward travel, a circuit is completed through the series of closed switches 186 and through a set of normally open contacts in relay CR3 to the solenoid of indexing valve 68. Operation of valve 68 shuts off the flow of fluid under pressure to cylinder 55 and instead allows fluid to be exhausted from the cylinder through valve 68. As previously explained, link 58 moves to the left in Fig. 7 under the influence of spring 70 to engage the next successive tooth 53b on indexing sprocket 53. As roller 59 moves into position behind tooth 53b, switch 71 is opened, opening the circuit to the holding coil of relay CR3. This deenergization of CR3 opens contacts in CR3 in series with valve 68 and breaks the circuit through solenoid valve 68 controlling the indexing cylinders. At the same time it completes the circuit to switch 73 and relay CR2. With valve 68 deenergized, it returns to its normal position in which fluid under pressure is admitted to cylinder 55, causing piston 56 to move forward and move indexing sprocket 53 in the advance direction through one-eighth of a revolution. This causes all the work holders to advance from one station to the next, presenting their respective work pieces to the next spindle S in sequence for the performance of another machining operation. When the indexing movement of the table is completed, arm 74 returns to engagement with "start down" switch 73, closing the contacts of that switch and completing the circuit through CR2. Completion of the circuit through relay CR2 starts again the complete cycle of operations as described above since now the downward movement of the spindles commences.

To stop the automatic operation, master switch 205 is returned to the off position. This causes all spindles to return to the top of the travel at the fast speed. If the machine has started to index, the indexing operation is first completed, after which no further operation of the indexing mechanism takes place. For this reason it is desirable to leave motor 143 on the hydraulic pump operating until the last in order to provide hydraulic pressure for return of the spindles. After this operation of master switch 205, switches 201, 202, and 203 may be opened individually in order to shut off all power to the machine.

With the control circuit shown, individual operations of the machine can be performed by manual control in order to facilitate setup of the work. For this purpose, after switching on motors M1 and M2, master switch 205 is moved to the hand position instead of the automatic. All spindles rise to the top of the travel, as before, if they are not already there when switch 206 is moved to "up" position.

By closing switch 207, the solenoid, of indexing valve 68 is energized, and the work table is advanced from one station to the next by the sequence of operations already described.

In order to lower the spindles, switch 206 is moved to the "down" position which energizes relay CR1. This action closes contacts in the relay which energize all of the solenoid valves 160 and 162. This causes all heads to move down at slow speed. It is preferable to close all six metering valves 132 and then open up only the one controlling the spindle being set up. All other spindles remain motionless. In this way one spindle at a time can be moved to proper position and the various stops and the like set as desired. To hold the spindle in position, the metering valve is closed. It will be noted that moving swicth 206 from the "up" position to the "down" position breaks the circuit to switch 207 so that the machine cannot be indexed during downward travel of the spindles. This interlocking arrangement of the circuits prevents accidental indexing movement which would damage the tools. To raise the heads, switch 206 is returned ot the "up" position which deenergizes relay CR1 and causes all spindles to raise at the fast speed.

From the foregoing description it will be understood that various changes may be made in the arrangement and operation of the various elements of my improved multiple spindle machine tool, without departing from the spirit and scope of my invention. Accordingly, it is to be understood that the foregoing description is considered as being illustrative of, rather than limitative upon, the appended claims.

I claim:

1. In a multiple spindle machine tool of the character described, the combination comprising: a frame; a work table rotatably mounted on the frame; a stationary head adjustably mounted on the frame; a plurality of rotatable spindles mounted on the head with their axes parallel to and equi-distant from the central axis of the head; a gear box mounted on the head for limited angular movement about said central axis; a primary power shaft concentric of said central axis; a plurality of drive pulleys arranged around the power shaft and rotatably mounted upon the gear box; a plurality of gear trains carried within the gear box and driving said drive pulleys from the primary power shaft; and belt means drivingly connecting each spindle to one of said drive pulleys, all the spacing between a drive pulley and the associated driven spindle being simultaneously adjustable by said angular movement of the gear box to tension properly the belt means.

2. A control valve for an hydraulic system comprising: a body having an inlet port communicating with two inlet passages, an outlet port, two delivery ports and an internal chamber in communication with both said inlet passages, said outlet port, and said delivery ports; a movable valve member within the body chamber movable between two operative positions to place a selected one of said two delivery ports in communication with the inlet passages and the other delivery port in communication with the outlet port; means for applying differential fluid pressure to either end of said movable valve member to move it from either one of said operative positions to the other; a second movable valve member adapted to close one of the inlet passages; and means for applying fluid pressure to said second valve member to move it to said position closing said one of the inlet passages.

3. A control valve as in claim 2 which also includes a manually adjustable valve in the other inlet passage to regulate fluid flow in said other passage when said one passage is closed.

4. In a multiple spindle machine tool of the character described, the combination comprising: a frame; a gear box mounted on the frame for limited angular movement about a central axis of the frame; a primary power shaft concentric of said axis; a plurality of drive pulleys arranged around the power shaft and rotatably mounted on the gear box; gear means drivingly connecting the pulleys to the power shaft to rotate the pulleys; an equal plurality of spindles rotatably mounted on the frame in fixed positions located around and radially outward of the gear box, each spindle carrying a driven pulley; and a plurality of belts each belt drivingly connecting one drive pulley to a single driven pulley on one of the spindles, the drive pulleys being so arranged that each one is at the same side of a radial plane passing through the central axis and the respective spindle driven by the pulley whereby angular movement of the gear box in one direction about said central axis simultaneously tightens the belts to all the spindles.

References Cited in the file of this patent

UNITED STATES PATENTS

| | | |
|---|---|---|
| 1,489,523 | Fox et al. | Apr. 8, 1924 |
| 1,621,145 | Weber | Mar. 15, 1927 |
| 1,822,691 | DeLeeuw | Sept. 8, 1931 |
| 1,990,052 | Sosa | Feb. 5, 1935 |
| 2,027,023 | Coulter | Jan. 7, 1936 |
| 2,114,284 | Barnes et al. | Apr. 19, 1938 |
| 2,394,769 | Heckethorn | Feb. 12, 1946 |

FOREIGN PATENTS

| | | |
|---|---|---|
| 123,354 | Germany | Sept. 20, 1901 |